United States Patent [19]

Murakami

[11] Patent Number: 5,722,609
[45] Date of Patent: Mar. 3, 1998

[54] TRAVERSE MECHANISM FOR A SPINNING REEL

[75] Inventor: Shinji Murakami, Tokyo, Japan

[73] Assignee: Daiwa Seiko, Inc., Tokyo, Japan

[21] Appl. No.: 815,085

[22] Filed: Mar. 11, 1997

[30] Foreign Application Priority Data

Mar. 12, 1996 [JP] Japan .................. 8-054802

[51] Int. Cl.⁶ .................................................. A01K 89/01
[52] U.S. Cl. .................................................. 242/241
[58] Field of Search ................................. 242/242, 241

[56] References Cited

U.S. PATENT DOCUMENTS

| | | | |
|---|---|---|---|
| 5,273,234 | 12/1993 | Hitomi | 242/241 |
| 5,308,017 | 5/1994 | Yoshikawa | 242/241 |
| 5,350,130 | 9/1994 | Hitomi et al. | 242/241 |
| 5,427,324 | 6/1995 | Kawashiro | 242/242 |

FOREIGN PATENT DOCUMENTS

6-57168  8/1994  Japan .

*Primary Examiner*—Katherine Matecki
*Attorney, Agent, or Firm*—Sughrue, Mion, Zinn, Macpeak & Seas, PLLC

[57] ABSTRACT

In the present spinning reel for fishing, a sliding member forming a part of a traverse mechanism is fixedly secured to the rear end portion of a spool shaft extending through a pinion in meshing engagement with a drive gear, the pinion or the spool shaft located adjacent to the pinion is supported by a bearing portion, and, in both of the reel main body of the spinning reel and sliding member, there are provided first and second guide parts which are respectively used to guide the sliding member back and forth in the longitudinal direction of the reel main body while preventing the loosening of the sliding member. The second guide part is structured in such a manner that it can guide and support more loosely on the front side of the reel main body in the neighborhood of the bearing portion than on the rear side of the reel main body, and the loosening of the sliding member on the front side of the reel main body can be prevented by the bearing portion and first guide part.

14 Claims, 8 Drawing Sheets

PRIOR ART

FIG. 15

TRAVERSE MECHANISM FOR A SPINNING REEL

BACKGROUND OF THE INVENTION

1. Field of the Invention

The present invention relates to a spinning reel for fishing and, in particular, to a spinning reel for fishing which prevents the loosened condition of a sliding member provided in a traverse mechanism for reciprocating a spool back and forth in the longitudinal direction of a reel main body of the spinning reel to thereby be able to carry out a smooth fishing line take-up operation.

2. Description of the Related Art

As known well, conventionally, in a spinning reel for fishing, a semi-annular bail is mounted on the leading end portion of a pair of support arms provided in a rotor in such a manner that the bail can be freely reversed between a fishing line take-up position and a fishing line play-out position through a pair of bail support members.

In the conventional spinning reel for fishing, when the bail is fallen down to the fishing line play-out position and the terminal tackles of the spinning reel are thrown out, then a fishing line wound around the spool can be played out in a spiral manner. On the other hand, when the bail is moved reversely to the fishing line take-up position and the rotor is rotated in a fishing line take-up direction by operating a handle provided on the spinning reel, then the fishing line can be wound around the spool which can be reciprocated back and forth in linking with the rotational movement of the rotor.

By the way, in order to prevent the loosened condition of a sliding member provided in a traverse mechanism for reciprocating a spool back and forth in the longitudinal direction of the spinning reel main body to thereby be able to carry out a smooth fishing line take-up operation, the present applicants have already proposed in Japanese Utility Model Publication No. 6-57168 of Heisei, a spinning reel for fishing in which, in a reel main body and a sliding member, there are formed a plurality guide parts for slidingly guiding the sliding member back and forth in the longitudinal direction of the reel main body to thereby prevent the sliding member from being loosened in the rotational direction of a traverse cam shaft.

Figure 14:
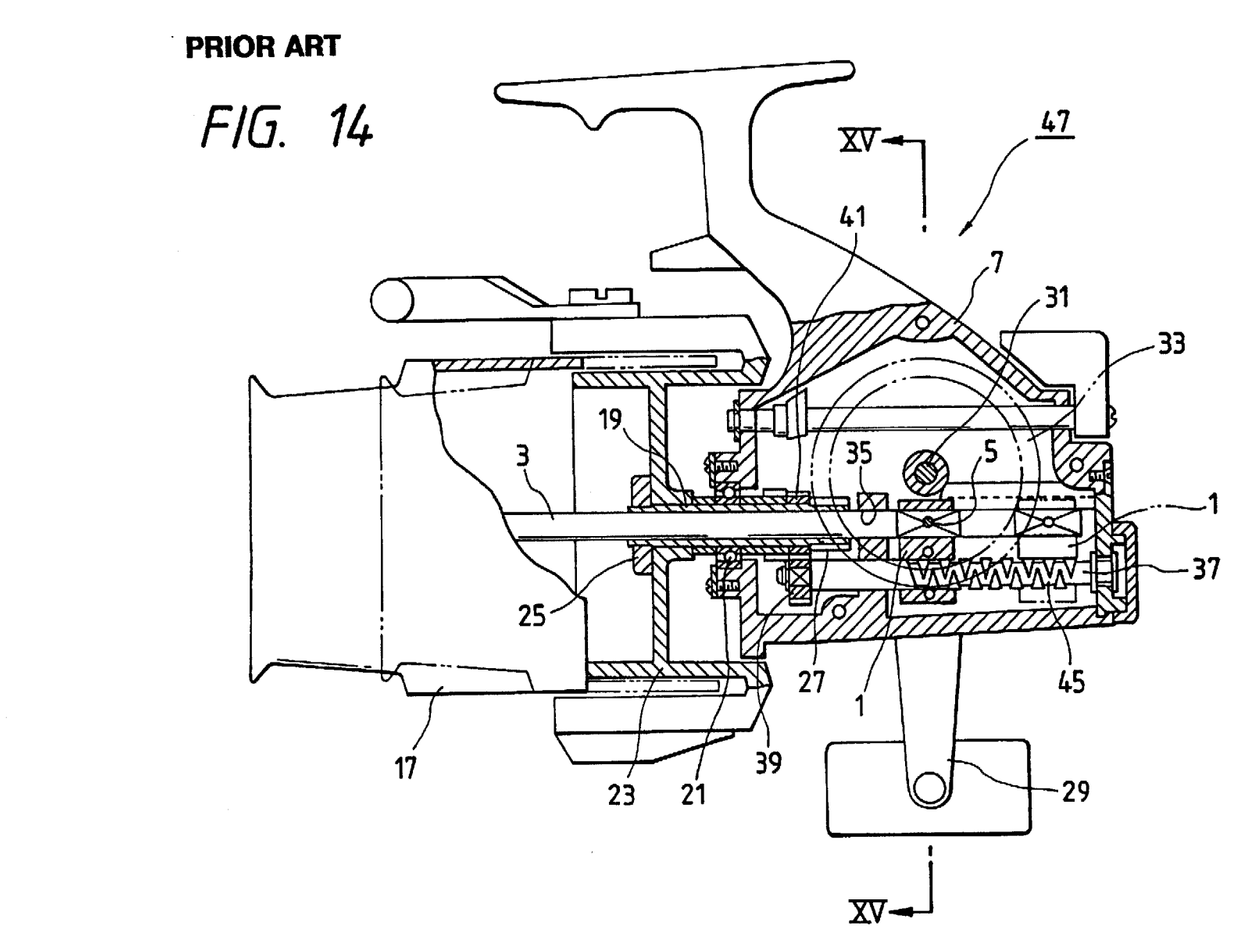
FIG. 14 is a partially cutaway side view of the main portions of a conventional spinning reel for fishing; and, FIG. 15 is a section view taken along the line XV—XV shown in FIG. 14.
Figure 15:
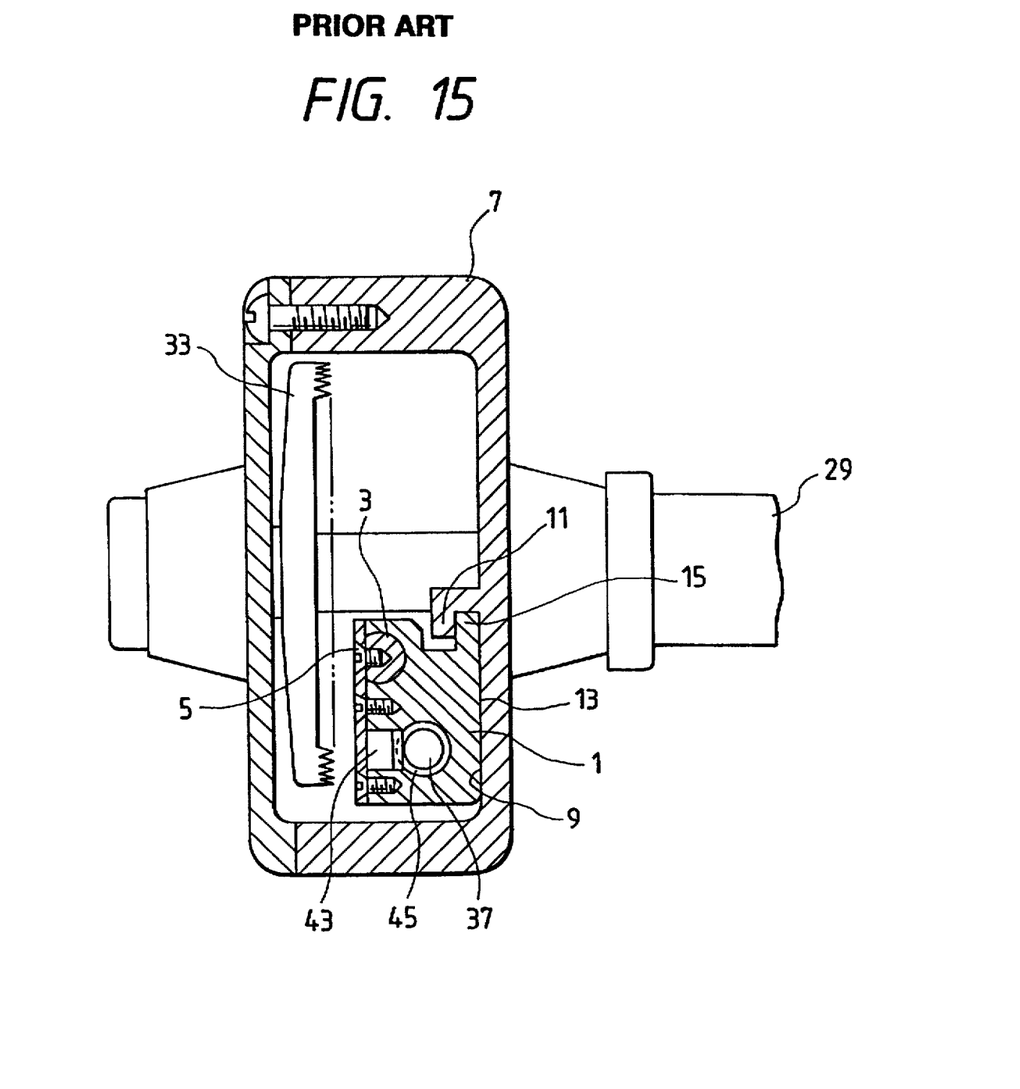

Now, in FIGS. 14 and 15, there is shown an embodiment of the spinning reel for fishing proposed by the present applicants in the above-mentioned Japanese Utility Model. In particular, in FIG. 14, reference character 1 designates a sliding member which is fixedly secured to the rear end portion of a spool shaft 3 by a screw 5. As shown in FIG. 15, a reel main body 7 includes a first engaging portion 9 having a plane-like shape and a second engaging portion 11 having a substantially L-shaped section which are both formed in the opposed surface thereof to the sliding member 1. On the other hand, on the sliding member 1 side, there are formed a sliding contact surface 13 slidingly engageable with the first engaging portion 9, and an engaging piece 15 engageable with the second engaging portion 11. The first engaging portion 9 and sliding contact surface 13 form a first guide part, while the second engaging portion 11 and engaging piece 15 form a second guide part.

According to the above-mentioned structure, when the fishing line is taken up, or when the fishing line is played out by rotating the spool 17 reversely, a force going in the rotation direction is applied to the sliding member 1 through the spool shaft 3 but, since the sliding member 1 is guided along the first engaging portion 9 while the engaging piece 15 is in engagement with the second engaging portion 11, the reel main body 7 and sliding member 1 are prevented from being loosened with respect to each other, so that the sliding member 1 is able to reciprocate back and forth smoothly in the longitudinal direction of reel main body.

Now, in FIG. 14, reference character 19 designates a hollow flier shaft journaled rotatably on the front portion of the reel main body 7 through a bearing 21, while a rotor 23 is fixed to leading end portion of the flier shaft 19 by a nut 25. Further, the flier shaft 19 includes a pinion 27 formed in the rear end portion thereof, while a drive gear 33 fixedly secured to a handle shaft 31 of a handle 29 is in meshing engagement with the pinion 27. Accordingly, the rotor 23 can be rotated by operating the handle 29.

The spool shaft 3 is inserted into the flier shaft 17 in such a manner that the spool shaft 3 can be reciprocated back and forth, while the rear portion of the spool shaft 3 is journaled by a bearing portion 35 which is located adjacent to the pinion 27.

In addition, in FIG. 14, numeral character 37 stands for a traverse cam shaft which is mounted in parallel to the spool shaft 3, and the traverse cam shaft 37 includes a small gear or a pinion 39 fixed to the leading end portion thereof. The pinion 39 is in meshing engagement with a linking gear 41 fixed to the outer periphery of the flier shaft 19, the sliding member 1 is fitted with the traverse cam shaft 37 and, as shown in FIG. 15, an engaging member 43 provided in the sliding member 1 is in engagement with a traverse cam groove 45.

That is, when the traverse cam shaft 37 is rotated by means of the operation of the handle 29 and the sliding member 1 is moved slidingly along the traverse cam groove 45, then the spool 17 can be reciprocated back and forth in the longitudinal direction of the reel main body 7.

However, in the above-mentioned conventional spinning reel 47, the parts thereof such as the first and second engaging portions 9, 11, sliding member 1, spool shaft 3 and the like must be produced with high precision and also these parts must be assembled into the spinning reel with high precision. If not, when the sliding member 1 is slidingly moved forward (in the direction of the bearing portion 35), not only the two guide parts provided between the reel main body 7 and sliding member 1 but also the bearing portion 35 operate to prevent the spool shaft 3, that is, sliding member 1 from being loosened, thereby increasing the sliding resistance of the sliding member 1, which raises a fear that the smooth back-and-forth movement of the spool 17 and the smooth rotation of the rotor 23 can be made impossible.

SUMMARY OF THE INVENTION

Accordingly, it is an object of the invention to provide a spinning reel for fishing which is able not only to prevent the loosening of a sliding member used to reciprocate a spool back and forth in the longitudinal direction of the spinning reel, but also to carry out a smooth fishing line take-up operation.

In attaining the above object, according to the invention, there is provided a spinning reel for fishing including a sliding member forming a part of a traverse mechanism for transforming a rotational movement of a handle into a linear reciprocating movement of a spool shaft, said sliding member being fixedly secured to the rear end portion of said spool shaft; a bearing portion provided in a reel main body for supporting said spool shaft; and first and second guide

3 parts provided between said reel main body and sliding member for guiding said linear reciprocating motion of said sliding member; wherein said second guide part guides and supports said sliding member more loosely on a front side of said reel main body in vicinity of said bearing portion than on a rear side of said reel main body; and further wherein a loosening of said sliding member on the rear side of said reel main body can be prevented by said first and second guide parts and the loosening of said sliding member on the front side of said reel main body can be prevented by said bearing portion and said first guide part.

When the fishing line is taken up, or when the fishing line is played out by rotating the spool reversely, a force going in the rotation direction is applied onto the sliding member through the spool shaft. However, according to a spinning reel for fishing as set forth in the respective claims of the invention, the first and second guide parts respectively guide the sliding member in the forward direction of the reel main body while preventing the sliding member from being loosened on the rear side of the reel main body. Also, the loosening of the sliding member on the front side of the reel main body can be prevented by the bearing portion and first guide part.

BRIEF DESCRIPTION OF THE DRAWINGS

The nature, utility and principle of the invention will be more clearly understood from the following detailed description and the appended claims when read in conjunction with the accompanying drawing. In the accompanying drawings:

4

DETAILED DESCRIPTION OF THE INVENTION

Now, description will be given below in detail of the preferred embodiments of a spinning reel for fishing according to the invention with reference to the accompanying drawings. In the following embodiments of the invention, since they are similar in structure to the conventional spinning reel for fishing shown in FIG. 14 except for the inventive portions thereof, the same parts are given the same designations and thus the description thereof is omitted here.

Figure 1:
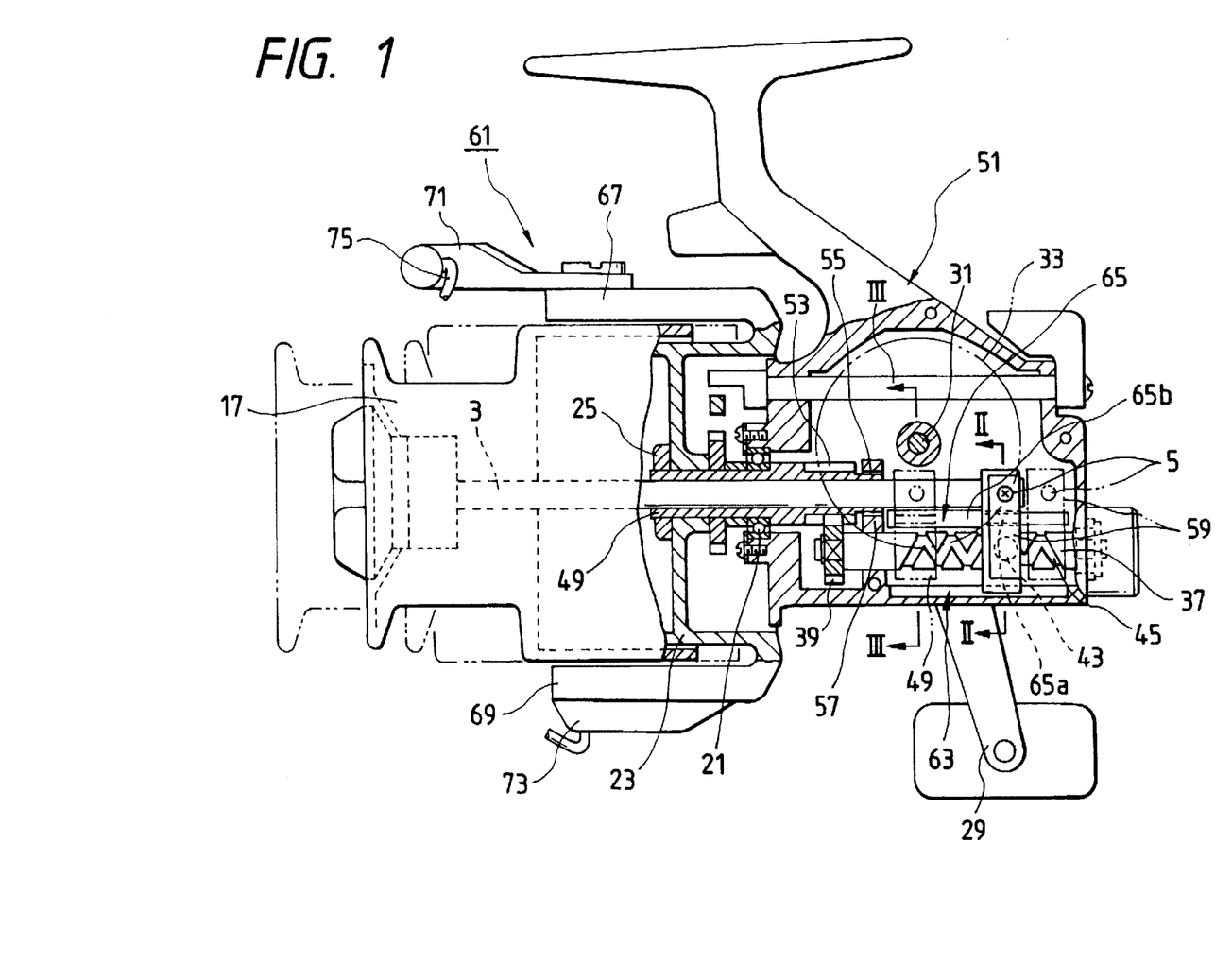
FIG. 1 is a partially cutaway side view of the main portions of an embodiment of a spinning reel for fishing according to the invention.
Figure 2:
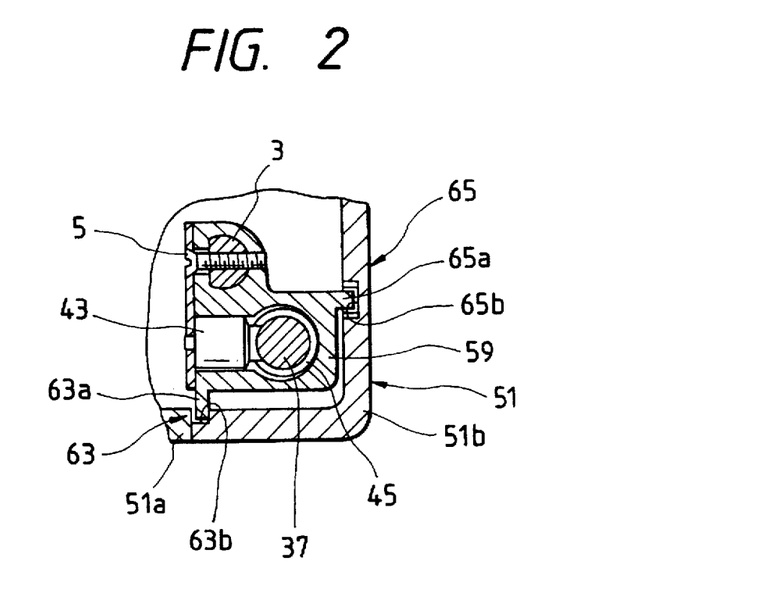
FIG. 2 is a section view showing a first embodiment of a spinning reel for fishing according to the invention, taken along the line II—II shown in FIG. 1.
Figure 3:
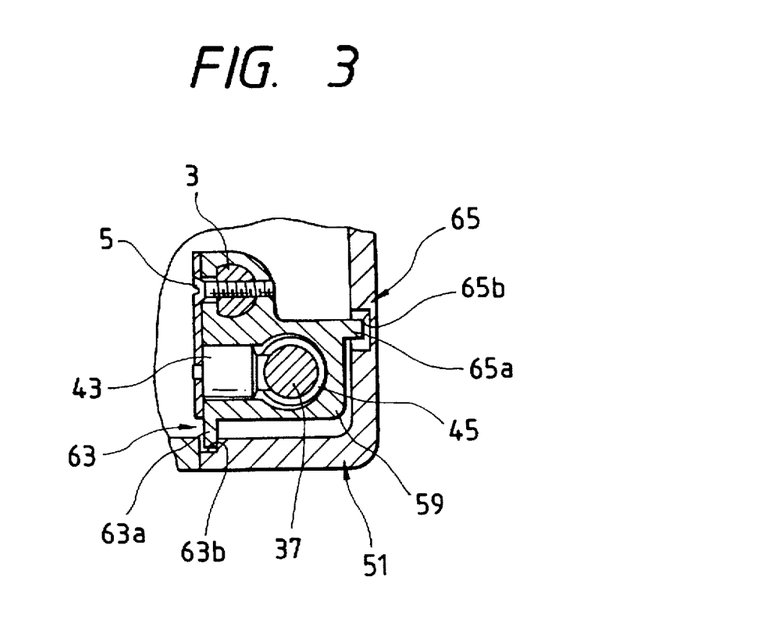
FIG. 3 is a section view showing a first embodiment of a spinning reel for fishing according to the invention, taken along the line III—III shown in FIG. 1.

At first, in FIGS. 1 to 3, reference character 49 stands for a hollow flier shaft which is rotatably journaled on a reel main body 51 through a bearing 21, while a rotor 23 is fixed to the leading end portion of the flier shaft 49 by a nut 25. The flier shaft 49 includes a pinion 53 formed in the rear end portion thereof. A drive gear 33 provided on a handle shaft 31 is in meshing engagement with the pinion 53 of the flier shaft 49 and, similarly to the conventional spinning reel for fishing, the rotor 23 can be rotated by operating a handle 29.

In addition, a spool shaft 3 is inserted into the above-mentioned flier shaft 49 in such a manner that the spool shaft 3 can be reciprocated back and forth, that is, in the longitudinal direction of the reel main body 51. According to the present embodiment, instead of the bearing portion 35 shown in FIG. 14, there is employed a cylindrical portion 55 which is so formed as to extend from the rear portion of the pinion 53, while the cylindrical portion 55 is journaled by a pinion bearing portion 57 which is provided in the reel main body 51.

Moreover, in the present embodiment, a small gear or a pinion 39, which is fixed to the leading end portion of a traverse cam shaft 37, is in direct mesh with the pinion 53, so that the traverse cam shaft 37 can be rotated through the flier shaft 49 by rotating the handle 29. A sliding member 59, which is fixed to the rear end portion of the spool shaft 3 by a screw 5, is fitted with the traverse cam shaft 37 and, as shown in FIG. 2, an engaging member 43 provided in the sliding member 59 is in engagement with a traverse cam groove 45. Thus, when the traverse cam shaft 37 is rotated by means of the operation of the handle 29 and the sliding member 59 is slidingly moved along the traverse cam groove 45, then a spool 17 can be reciprocated back and forth in the longitudinal direction of the reel main body 51 through the spool shaft 3.

In a spinning reel 61 according to the present embodiment as well, in order to prevent the sliding member 59 from being loosened to thereby be able to perform a smooth fishing line take-up operation, in both of the reel main body 51 and sliding member 59, there are provided first and second guide parts 63 and 65 which are respectively used to guide the sliding member 59 back and forth in the longitudinal direction of the reel main body 51, thereby being able to prevent the sliding member 59 from being loosened in the rotational direction of the traverse cam shaft 37.

In particular, the first guide part 63, as shown in FIGS. 2 and 3, includes a flat-plate-shaped engaging piece member 63a which is provided on and projected from the bottom portion of the sliding member 59 in the direction of the bottom portion of the reel main body 51, and an engaging groove 63b into which the engaging piece member 63a can be engaged. The engaging groove 63b is formed in the reel main body 51 in such a manner that it extends along the traverse cam shaft 37 in the back-and-forth or longitudinal direction of the reel main body 51 and also has a uniform width and a uniform depth.

In the present embodiment, the reel main body 51, as shown in FIG. 2, is composed of a reel cover 51a and a reel body 51b, while the above-mentioned engaging groove 63b is so formed in the reel body 51b as to extend along the connecting portion thereof with the reel cover 51a.

On the other hand, the second guide part 65, as shown in FIGS. 2 and 3, is composed of a flat-plate-shaped engaging piece member 65a which is provided on and projected from one side portion of the sliding member 59 in the one side direction of the reel main body 51 (that is, in the direction of the reel body 51b), and an engaging groove 65b formed in the reel main body 51 (in particular, reel body 51b). The engaging groove 65b is formed in such a manner that it extends along the traverse cam shaft 37 in the longitudinal direction of the reel main body 51 and also has a uniform depth. Further, as shown in FIG. 1, the engaging groove 65b is so formed as to become larger in width sequentially from the rear portion of the reel main body 51 toward the front portion thereof, in order to be able to guide and support the sliding member 59 more loosely on the front side of the reel main body 51 in the neighborhood of the pinion bearing portion 57 than on the rear side of the reel main body 51. Accordingly, the loosening of the sliding member 59 on the rear side of the reel main body 51 can be prevented by the first and second guide parts 63 and 65, while the loosening of the sliding member 59 on the front side of the reel main body 51 can be prevented by the pinion bearing portion 57 and first guide part 63.

Further, in FIG. 1, reference characters 67 and 69 designate a pair of support arms which are formed integrally with the rotor 17. A semi-annular bail 75 is mounted through two bail support members 71 and 73 on the leading end portions of the two support arms 67 and 69 in such a manner that the bail 75 can be reversed between a fishing line take-up position and a fishing line play-out position.

Since the present embodiment is structured in the above-mentioned manner, similarly to the conventional spinning reel for fishing, when the bail 75 is fallen down to the fishing line play-out position and the terminal tackles of the present spinning reel are thrown out, then a fishing line wound around the spool 17 can be played out in a spiral manner. On the other hand, when the bail 75 is moved reversely to the fishing line take-up position and the rotor 23 is rotated in a fishing line take-up direction by operating the handle 29, then the fishing line can be wound around the spool 17 which can be reciprocated back and forth in the longitudinal direction of the reel main body in linking with the rotation of the rotor 23.

When the fishing line is taken up or when the fishing line is played out by reversing the rotation of the spool 17, a force going in the rotational direction is applied onto the sliding member 59 through the spool shaft 3. In spite of this, according to the present embodiment, the engaging grooves 63b and 65b formed on the reel main body 51 side, with which the engaging piece members 63a and 65a are respectively engaged, can guide the sliding member 59 in the forward direction of the reel main body 51 while they are preventing the sliding member 59 from being loosened on the rear side of the reel main body 51.

As described before, the engaging groove 65b of the second guide part 65 is formed such that it is sequentially larger in width from the rear side of the reel main body 51 toward the front side of the reel main body 51, so that the sliding member 59 can be guided and supported more loosely on the front side of the reel main body 51 in the neighborhood of the pinion bearing portion 57 than on the rear side of the reel main body 51. Due to this, the loosening of the sliding member 59 on the front side of the reel main body 51 can be prevented by the pinion shaft bearing portion 57 and first guide part 63.

In above manner, according to the present embodiment, even if the parts thereof such as the above-mentioned engaging piece members 63a, 65a, engaging grooves 63b, 65b, spool shaft 3 and the like are not produced with high precision, or if when these parts are not assembled into the present spinning reel with high precision, when the sliding member 59 is moved forward, the loosening of the sliding member 59 can be prevented only by the pinion bearing portion 57 and first guide part 63, which eliminates the possibility that the sliding resistance of the sliding member 59 can be increased as in the conventional structure shown in FIG. 14. As a result of this, while preventing the loosening of the sliding member 59, the sliding member 59 can be guided smoothly in the forward and rearward directions of the reel main body 51, so that the fishing line can be taken up smoothly.

Figure 4:
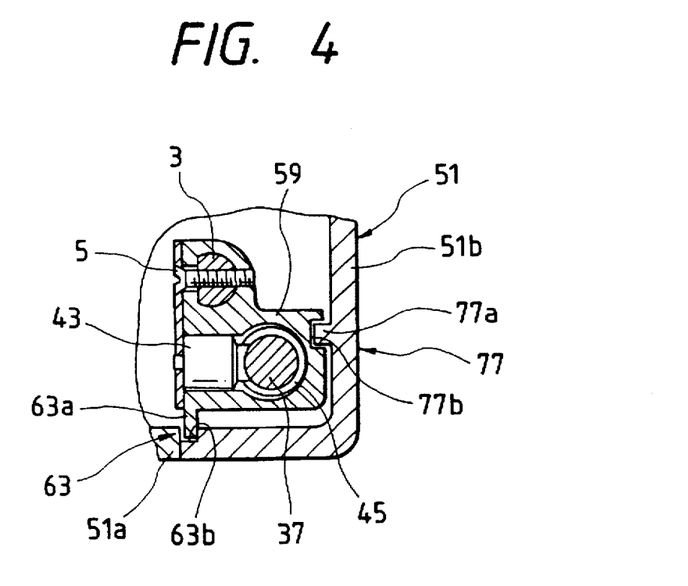
FIG. 4 is a section view showing a second embodiment of a spinning reel for fishing according to the invention, taken along the line II—II of FIG. 1.
Figure 5:
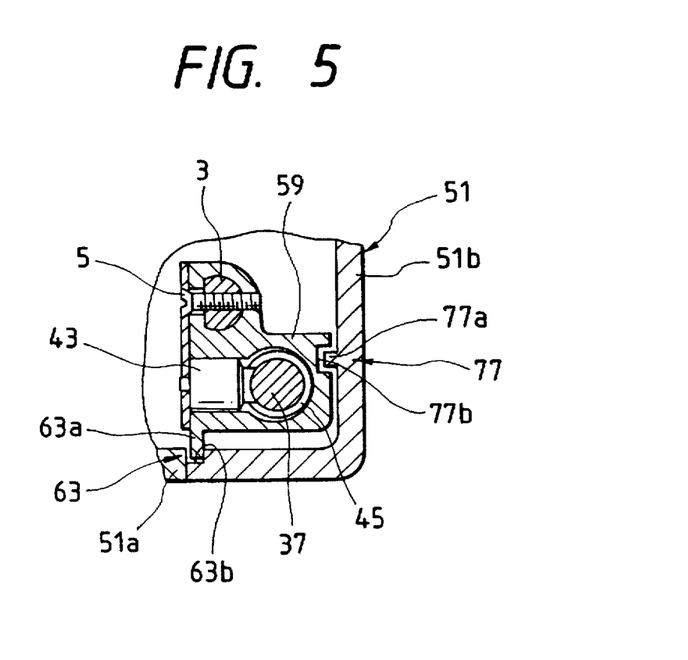
FIG. 5 is a section view showing a second embodiment of a spinning reel for fishing according to the invention, taken along the line III—III of FIG. 1.

Now, FIGS. 4 and 5 show a second embodiment of a spinning reel according to the invention. As shown in FIGS. 4 and 5, according to the present embodiment, instead of the above-mentioned second guide part 65, there is employed a second guide part 77 which is composed of an engaging piece member 77a provided on and projected from one side portion of the reel main body 51 (in particular, reel body 51b) toward the one side direction of the sliding member 59, and an engaging groove 77b engageable with the engaging piece member 77a. Then, the engaging groove 77b is formed in one side surface of the sliding member 59 in such a manner that it extends along the traverse cam shaft 37 in the longitudinal direction of the reel main body 51 and has a uniform width and a uniform depth.

The engaging piece member 77a is also formed such that it extends along the traverse cam shaft 37 in the longitudinal direction of the reel main body 51. However, in order to be able to guide and support the sliding member 59 more loosely on the front side of the reel main body 51 in the neighborhood of the pinion bearing portion 57 than on the rear side of the reel main body 51, the engaging piece member 77a is formed in such a manner that it is narrower in width sequentially from the rear portion of the reel main body 51 toward the front portion of the reel main body 51. Accordingly, the loosening of the sliding member 59 on the rear side of the reel main body 51 can be prevented by the first guide part 63 and second guide part 77, whereas the loosening of the sliding member 59 on the front side of the reel main body 51 can be prevented by the pinion bearing portion 57 and first guide part 63.

The remaining portions of the structure of the present embodiment are similar to those of the embodiment shown in FIG. 1. Therefore, the same parts are given the same designations and thus the description thereof is omitted here.

Since the present embodiment is structured in above manner, when the fishing line is taken up, or when the fishing line is played out by rotating the rotation of the spool 17 reversely, in spite of the fact that a force going in the rotation direction is applied onto the sliding member 59 through the spool shaft 3, the sliding member 59 can be guided in the forward direction of the reel main body 51 while the loosening of the sliding member 59 on the rear side of the reel main body 51 is prevented by the engaging grooves 63b and 77b with which the engaging piece members 63a and 77a are respectively engaged.

Further, since the engaging piece member 77a of the second guide part 77 is formed sequentially narrower in width from the rear side of the reel main body 51 toward the front side thereof in order to be able to guide and support the sliding member 59 on the front side of the reel main body 51 in the neighborhood of the pinion bearing portion 57 more loosely than on the rear side of the reel main body 51, the loosening of the sliding member 59 on the front side of the reel main body 51 can be prevented by the pinion bearing portion 57 and first guide part 63.

Therefore, according to the present embodiment as well, even if the parts thereof such as the engaging piece members 63a, 77a, engaging grooves 63b, 77b, spool shaft 3 and the like are not produced with high precision, or even if these parts are not assembled into the present spinning reel with high precision, when the sliding member 59 is moved forward, the loosening of the sliding member 59 can be prevented only by the pinion bearing portion 57 and first guide part 63. This eliminates the possibility that the sliding resistance of the sliding member 59 can be increased as in the conventional structure shown in FIG. 14. Accordingly, the sliding member 59 can be guided smoothly in the forward and backward directions while preventing the loosening of the sliding member 59, thereby being able to realize a smooth fishing line take-up operation.

Figure 6:
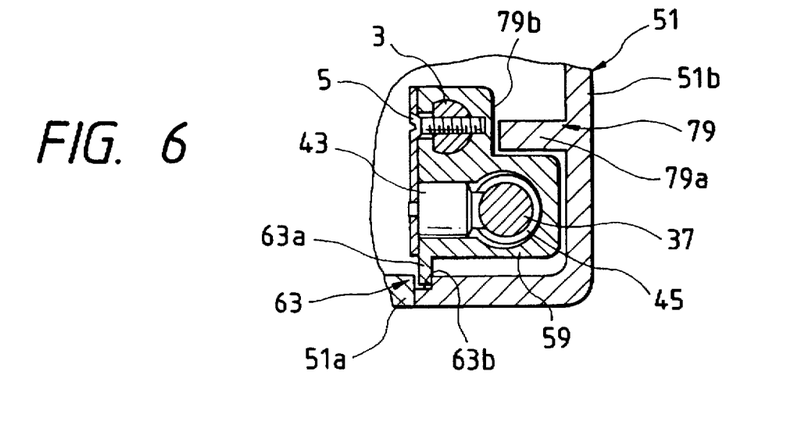
FIG. 6 is a section view showing a third embodiment of a spinning reel for fishing according to the invention, taken along the line II—II of FIG. 1.
Figure 7:
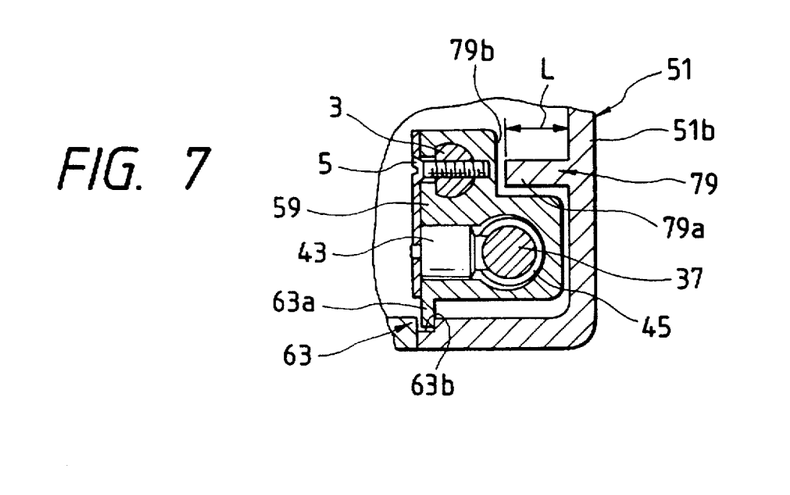
FIG. 7 is a section view showing a third embodiment of a spinning reel for fishing according to the invention, taken along the line III—III of FIG. 1.
Figure 8:
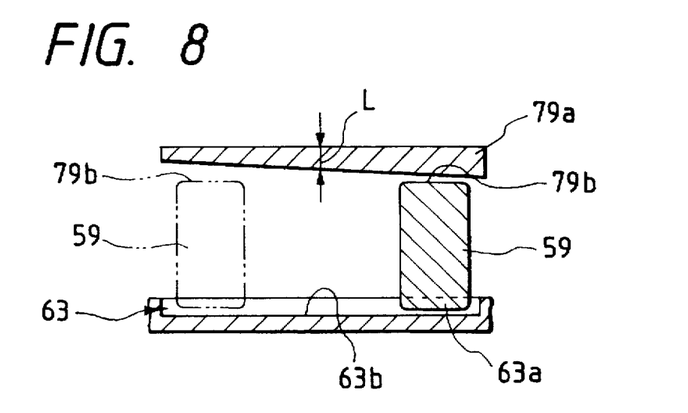
FIG. 8 is a schematic explanatory view of first and second guide parts in a third embodiment of a spinning reel for fishing according to the invention.

Now, FIGS. 6 to 8 show a third embodiment of a spinning reel for fishing according to the invention. According to the present embodiment, instead of the above-mentioned second guide 65, there is used a second guide part 79: that is, the second guide part 79 is composed of a projecting piece member 79a which is projected from one side portion of the reel main body 51 (in particular, the reel body-51b thereof) in one side direction of the sliding member 59, and a flat and smooth sliding contact surface 79b which is formed on the sliding member 59 side and with which the leading end portion of the projecting piece member 79a can be contacted.

The present projecting piece member 79a is so formed as to extend along the traverse cam shaft 37 in the longitudinal direction of the reel main body 51. Further, in order to be able to guide and support the sliding member 59 on the front side of the reel main body 51 in the neighborhood of the pinion bearing portion 57 more loosely than on the rear side of the reel main body 51, as shown in FIG. 8, the projecting piece member 79a is formed in such a manner that the amount of projection thereof L becomes smaller sequentially from the rear side of the reel main body 51 toward the front side thereof. Due to such structure, the loosening of the sliding member 59 on the rear side of the reel main body 51 can be prevented by the first guide part 63 and second guide part 79, whereas the loosening of the sliding member 59 on the front side of the reel main body 51 can be prevented by the pinion bearing portion 57 and first guide part 63.

The remaining portions of the structure of the present embodiment are also similar to those of the embodiment shown in FIG. 1 and, therefore, the same parts are given the same designations and thus the description thereof is omitted here.

Since the present embodiment is structured in the above manner, similarly to the previously described embodiments of the invention, the sliding member 59 can be guided smoothly in the forward and backward directions of the reel main body while preventing the loosening of the sliding member 59, thereby being able to carry out a smooth fishing line take-up operation.

Figure 9:
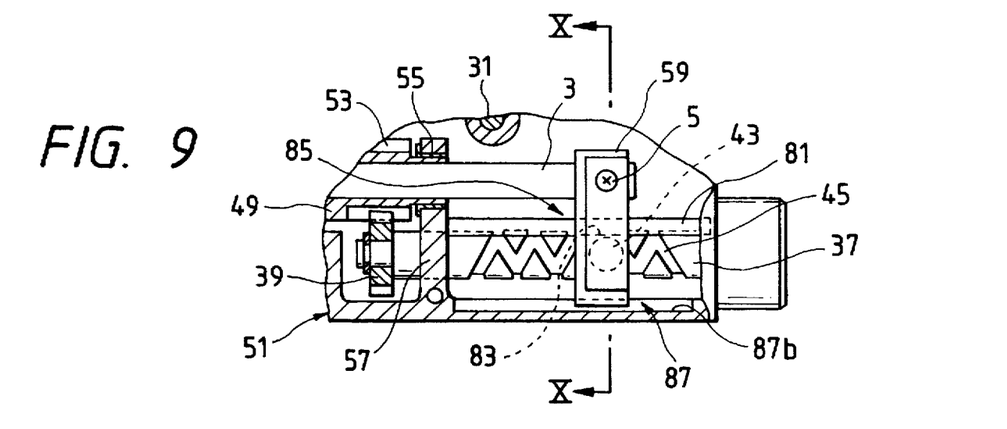
FIG. 9 is an enlarged side view of the main portions of a fourth embodiment of a spinning reel for fishing according to the invention.
Figure 10:
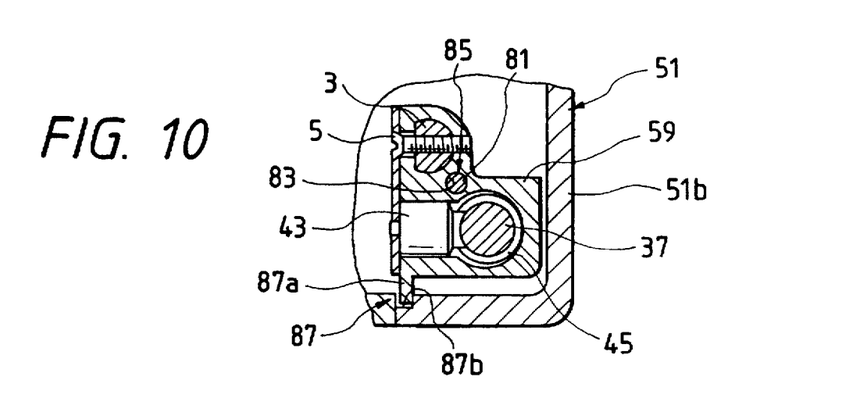
FIG. 10 is a section view showing a fourth embodiment, taken along the line X—X shown in FIG. 9.
Figure 11:
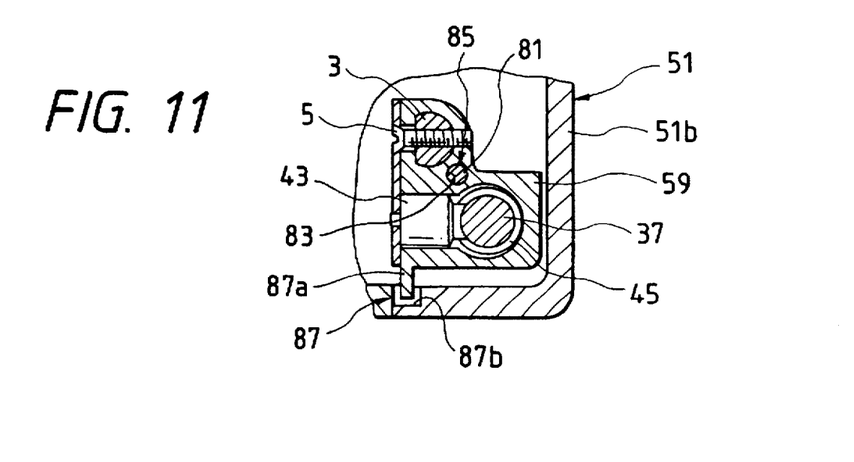
FIG. 11 is a section view of the fourth embodiment of a spinning reel for fishing according to the invention, taken along the line III—III of FIG. 1.

Now, FIGS. 9 to 11 show a forth embodiment of a spinning reel for fishing according to the invention. In FIGS. 9 to 11, reference character 81 designates a pillar having a circular section which extends along the traverse cam shaft 37 and is loosely inserted through an insertion hole 83 formed in the sliding member 59. The pillar 81 is structured such that the two end portions thereof are respectively supported by the reel main body 51 and pinion bearing portion 57. In the present embodiment, the pillar 81 forms a first guide part 85 which prevents the sliding member 59 from being loosened.

In addition, as shown in FIG. 10, according to the present embodiment, a second guide part 87 for prevention of the loosened sliding member 59 is composed of a flat-plate-shaped engaging piece member 87a which is provided on and projected from the bottom portion of the sliding member 59 in the direction of the bottom portion of the reel main body 51, and an engaging groove 87b with which the engaging piece member 87a can be engaged. As shown in FIG. 9, the engaging groove 87b is formed in such a manner that it extends along the traverse cam shaft 37 in the longitudinal direction of the reel main body 51 and also has a uniform depth and, further, in order to be able to guide and support the sliding member 59 on the front side of the reel main body 51 in the neighborhood of the pinion bearing portion 57 more loosely than on the rear side of the reel main body 51, as shown in FIGS. 10 and 11, the engaging groove 87b is formed in such a manner that it becomes larger in width sequentially from the rear side of the reel main body 51 toward the front side thereof. Due to this structure, the loosening of the sliding member 59 on the rear side of the reel main body 51 can be prevented by the first guide part 85 and second guide part 87, while the loosening of the sliding member 59 on the front side of the reel main body 51 can be prevented by the pinion bearing portion 57 and first guide part 85.

The remaining portions of the structure of the present embodiment are also similar to those of the embodiment shown in FIG. 1 and, therefore, the same parts are given the same designations and thus the description thereof is omitted here.

Since the present embodiment is structured in the above manner, similarly to the previously described embodiments, the sliding member 59 can be guided smoothly in the forward and backward directions of the reel main body while preventing the loosening of the sliding member 59, thereby being able to achieve the expected object of the invention.

Figure 12:
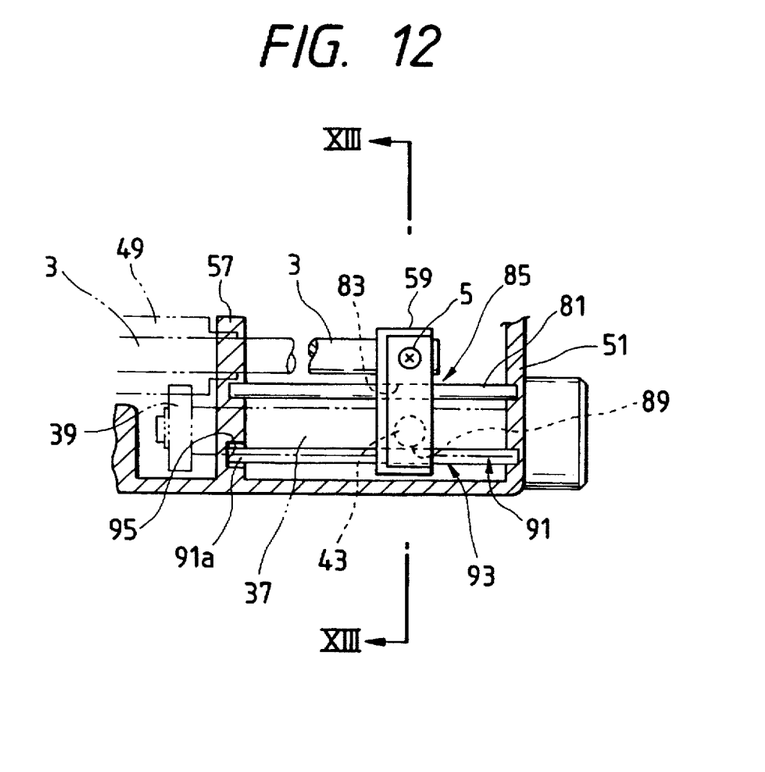
FIG. 12 is an enlarged side view of the main portions of a fifth embodiment of a spinning reel for fishing according to the invention.
Figure 13:
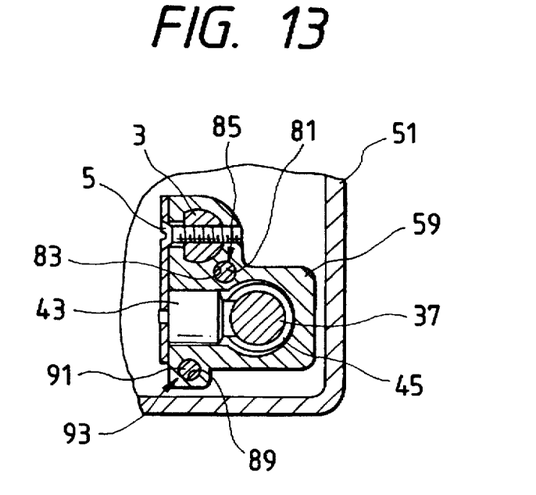
FIG. 13 is a section view showing a fifth embodiment of a spinning reel for fishing according to the invention, taken along the line XIII—XIII shown in FIG. 12.

Now, FIGS. 12 and 13 show a fifth embodiment of a spinning reel for fishing according to the invention. As shown in FIGS. 12 and 13, in the present embodiment, instead of the second guide part 87 used in the embodiment shown in FIG. 9, there is employed a second guide part 93 consisting of a pillar 91 which extends along the traverse cam shaft 37 and is loosely inserted through an insertion hole 89 which is formed in the sliding member 59.

The pillar 91 is further structured such that the two end portions thereof are respectively supported by the reel main body 51 and pinion bearing portion 57. Further, in order that the second guide part 93 or the pillar 91 is able to guide and support the sliding member 59 on the front side of the reel main body 51 in the neighborhood of the pinion bearing portion 57 more loosely than on the rear side of the reel main body 51, a support hole 95, which is formed on the pinion bearing portion 57 side for supporting the pillar 91, is set slightly larger in diameter than the outside diameter of the pillar 91, and the front side end portion 91a of the pillar 91 is loosely inserted into the pinion bearing portion 57.

The remaining portions of the structure of the present embodiment are also similar to those of the embodiment shown in FIG. 9 and, therefore, the same parts are given the same designations and thus the description thereof is omitted here.

Since the present embodiment is structured in above manner, when the fishing line is taken up, or when the fishing line is played out by reversing the rotation of the spool 17, in spite of the fact that a force going in the rotation direction is applied to the sliding member 59 through the spool shaft 3, the sliding member 59 can be guided in the forward direction of the reel main body 51 while the loosening of the sliding member 59 on the rear side of the reel main body 51 is prevented by the pillars 81 and 91 which are respectively inserted through the sliding member 59.

In the present embodiment, when the parts thereof such as the insertion holes 83, 89 of the sliding member 59, pillars 81, 91 and the like are produced with high precision, or when these parts are not assembled into the present spinning reel with high precision, if the sliding member 59 is moved forward, then the front side end portion 91a of the pillar 91 is slightly moved within the support hole 95 in response to the movement of the sliding member 59 so as to thereby be able to prevent an increase in the sliding resistance of the sliding member 59, while the loosening of the sliding member 59 can be prevented by the pinion bearing portion 57 and first guide part 85.

Therefore, with use of the present embodiment as well, similarly to the previously described embodiments, the sliding member 59 can be guided smoothly in the longitudinal direction of the reel main body 51 while preventing the loosening of the sliding member 59, thereby being able to perform a smooth fishing line take-up operation.

As has been described heretofore, according to a spinning reel for fishing of the present invention, the sliding member can be guided smoothly in the longitudinal direction of the reel main body while preventing the loosening of the sliding member, thereby being able to achieve a smooth fishing line take-up operation.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A traverse mechanism for a spinning reel for fishing comprising:

a sliding member forming a part of a traverse mechanism for transforming a rotational movement of a handle into a linear reciprocating movement of a spool shaft, said sliding member being fixedly secured to a rear end portion of said spool shaft;

a bearing portion provided in a reel main body for supporting said spool shaft; and first and second guide parts provided between said reel main body and sliding member for guiding said linear reciprocating movement of said sliding member;

wherein said second guide part guides and supports said sliding member more loosely on a front side of said reel main body in the vicinity of said bearing portion than on a rear side of said reel main body; and further wherein a rear loosening of said sliding member on the rear side of said reel main body can be prevented by said first and second guide parts and a front loosening of said sliding member on the front side of said reel main body can be prevented by said bearing portion and said first guide part.

2. A traverse mechanism for a spinning reel for fishing according to claim 1, wherein said second guide part includes an engaging groove and an engaging piece member engageable into said engaging groove, and said engaging groove is formed so as to become larger in width gradually from the rear portion of said reel main body toward the front portion thereof.

3. A traverse mechanism for a spinning reel for fishing according to claim 2, wherein said first guide part has a first pillar extending through said sliding member in parallel to said spool shaft, two ends thereof being supported by said reel main body.

4. A traverse mechanism for a spinning reel for fishing according to claim 1, wherein said second guide part includes an engaging groove and an engaging piece member engageable into said engaging groove, and said engaging piece member is formed so as to become narrower in width gradually from the rear portion of said reel main body toward the front portion thereof.

5. A traverse mechanism for a spinning reel for fishing according to claim 1, wherein said second guide part includes a projecting piece member and a sliding surface slidingly contactable with said projecting piece member, and said projecting piece member is formed so as to become narrower in the projecting width thereof gradually from the rear portion of said reel main body toward the front portion thereof.

6. A traverse mechanism for a spinning reel for fishing according to claim 1, wherein said second guide part includes a first pillar loosely extending through said sliding member in parallel to said spool shaft and having the two ends thereof supported by said reel main body, and said first pillar is formed such that the end portion thereof on the front side of said reel main body is loosely inserted through said reel main body.

7. A traverse mechanism for a spinning reel for fishing according to claim 1, wherein said second guide part defines a first face formed on said sliding member and a second mating face formed on said reel main body and facing said first face, said second mating face being elongated obliquely with respect to an axis of said spool shaft, whereby said first face contacts said second mating face when said sliding member is located at said rear side of said reel main body and a rotationally force of said spool shaft is applied to said sliding member, and said first face is kept away from said second mating face when said sliding member is located at a front side of said reel main body and said rotationally force is applied.

8. A spinning reel for fishing comprising:

a reel main body;

a spool supported on a pool shaft mounted on the reel main body;

a sliding member forming a part of a traverse mechanism for transforming a rotational movement of a handle shaft into a linear reciprocating movement of said spool shaft, said sliding member being fixedly secured to a rear end portion of said spool shaft; and first and second guide parts provided between said reel main body and sliding member for guiding said linear reciprocating movement of said sliding member;

wherein said second guide part guides and supports said sliding member more loosely as said spool shaft moves forwardly from a rear side of said reel main body.

9. A spinning reel for fishing according to claim 8, wherein said second guide part defines a first face formed on said sliding member and a second mating face formed on said reel main body and facing said first face, said second mating face being elongated obliquely with respect to an axis of said spool shaft, whereby said first face contacts said second mating face when said sliding member is located at said rear side of said reel main body and a rotationally force of said spool shaft is applied to said sliding member, and said first face is kept away from said second mating face when said sliding member is located at a front side of said reel main body and said rotationally force is applied.

10. A spinning reel for fishing according to claim 9, wherein said second guide part includes an engaging groove and an engaging piece member engageable into said engaging groove, and said engaging groove is formed so as to become larger in width gradually from the rear portion of said reel main body toward the front portion thereof.

11. A spinning reel for fishing according to claim 10, wherein said first guide part has a second pillar extending through said sliding member in parallel to said spool shaft, two ends thereof being supported by said reel main body.

12. A spinning reel for fishing according to claim 9, wherein said second guide part includes an engaging groove and an engaging piece member engageable into said engaging groove, and said engaging piece member is formed so as to become narrower in width gradually from the rear portion of said reel main body toward the front portion thereof.

13. A spinning reel for fishing according to claim 9, wherein said second guide part includes a projecting piece member and a sliding surface slidingly contactable with said projecting piece member, and said projecting piece member is formed so as to become narrower in the projecting width thereof gradually from the rear portion of said reel main body toward the front portion thereof.

14. A spinning reel for fishing according to claim 9, wherein said second guide part includes a pillar loosely extending through said sliding member in parallel to said spool shaft and having the two ends thereof supported by said reel main body, and said pillar is formed such that the end portion thereof on the front side of said reel main body is loosely inserted through said reel main body.

* * * * *